Sept. 4, 1962 S. L. MARGOLIES 3,052,868
ELECTRICAL CONNECTOR
Filed June 2, 1958

INVENTOR
SAMUEL L. MARGOLIES
BY
ATTORNEY

United States Patent Office 3,052,868
Patented Sept. 4, 1962

3,052,868
ELECTRICAL CONNECTOR
Samuel L. Margolies, Norwalk, Conn., assignor to Burndy Corporation, a corporation of New York
Filed June 2, 1958, Ser. No. 739,096
2 Claims. (Cl. 339—244)

This invention relates to electrical connectors, and more particularly, split bolt connectors such as are commonly used for attaching a tap line to a main line.

Such connectors usually consist of a slotted bolt, a clamping threaded nut on the shank of the slotted bolt and carrying a pressure bar which fits in the slot of the bolt and has extensions which ride on the face of the nut for exerting pressure in the connected wire. Usually, the nut and pressure bar are assembled together in unitary rotatable relationship. Ordinarily, the nut-pressure bar assembly and the slotted bolt, when disengaged from each other, are separable units. The result is that parts may be dropped and lost, and inasmuch as both parts are essential for each unit, if either the slotted bolt or nut-pressure bar assembly is lost, the other part of the connector is useless and must be discarded.

In the past, in order to eliminate this disadvantage, so-called nut retainers have been devised. Due to the nature of the split bolt and the necessity of using it for connection to a main line, such nut retainers merely hinged to the nut after it had been unthreaded from the split bolt, permitting the conductors to be located between the threaded legs. This necessitated rethreading the nut on the bolt after the conductors were placed in junction.

My invention is an improvement on the previously devised nut retainer and split bolt assemblies and eliminates many of the disadvantages inherent in the prior art devices.

One of the objects of my invention is to provide a split bolt wire connector in which the nut need not be unthreaded from the bolt in order to attach the connector to the wire or cables.

Another object of my invention is to provide a split bolt connector in which the backing off of the nut in the threaded legs of the bolt will automatically open the head of the bolt for insertion of the wire or cable to be connected.

A further object of my invention is to provide a connector of the split bolt type wherein it is not necessary to completely back off the nut and pad assembly in order to insert the conductors to be connected.

One of the features of my invention is the provision of a split bolt type connector in which the threaded legs are parallel to each other near the head of the bolt and are flared at their extremities, and the head of the split bolt is cut to provide an entrance for the conductors. As the nut is backed off towards the end of the threaded legs of the split bolt, the flaring or curved portion of the threaded legs force the cut head of the bolt to open permitting the conductors to be inserted therein. As the nut is tightened on the legs, the nut head is closed and the conductors are clamped between the pressure bar and the closed head of the bolt. The ends of the legs are peened to prevent unthreading or removal of the nut-pressure bar assembly.

These and other objects and features obtained and my new results will be apparent from the device described in the following specification, particularly pointed out in the attached claims, and illustrated in the accompanying drawing, in which:

Figure 3:
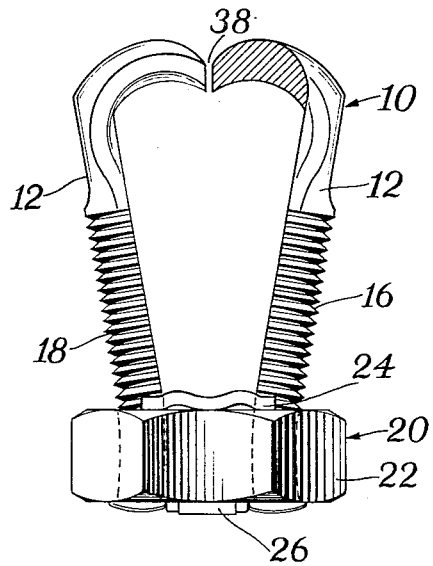
FIG. 3 is a side elevational view of the connector of my invention prior to assembly; and, FIG. 4 is a top end view of the connector illustrated in FIG. 3.
Figure 2:
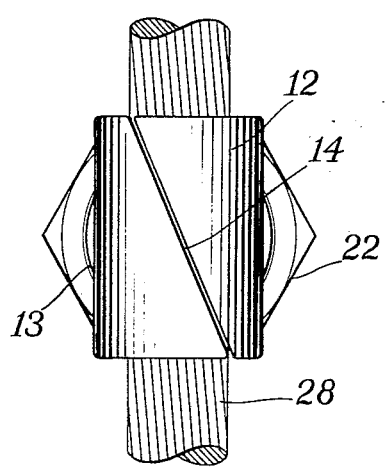
FIG. 2 is a top end view of the connector illustrated in FIG. 1.
Figure 4:
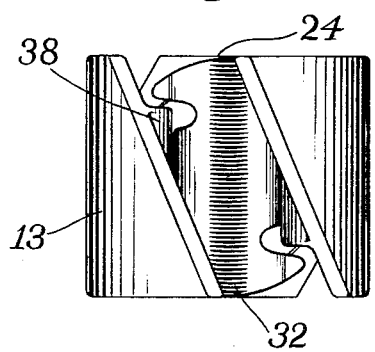

Referring more particularly to the drawing, reference numeral 10 identifies the split bolt connector in accordance with the principles of my invention having a U shaped head 12 provided with flat sides 13. Integrally extending from the head 12 is a shank portion which is split substantially throughout its length to form a pair of spaced apart externally threaded legs 16 and 18. The legs 16 and 18 are spaced apart to receive between them a plurality of conductors such as 28 and 30 representing a main line and tap conductor and also to receive the pressure bar 24. The externally threaded legs 16 and 18 are slightly curved outwardly from each other at the outer ends of the U. A nut and pressure pad assembly 20 is threaded on the legs 16 and 18. The nut and pressure pad assembly 20 comprises a hexagonally shaped nut 22 and a pressure pad 24. As is usual, the lower portion 26 of the pressure pad 24 is peened over to make a unitary assembly with the hexagonal nut 22. The nut and pressure pad assembly 20 is threaded onto the legs 16 and 18, as shown in FIG. 3, and the pressure pad 24 rides in the longitudinal split of the U bolt. If desired, the inner portion of the head of the U bolt and the inner face of the pressure pad 24 may be contoured to accommodate the conductors 28 and 30. In addition, as shown in FIG. 4, the inner face of the pressure pad 24 may be serrated 32 to grip the conductor 30. The ends 34 and 36 of the threaded legs 16 and 18 are headed or peened over to prevent the nut and pressure pad assembly 20 from completely backing off the threaded portion.

Figure 1:
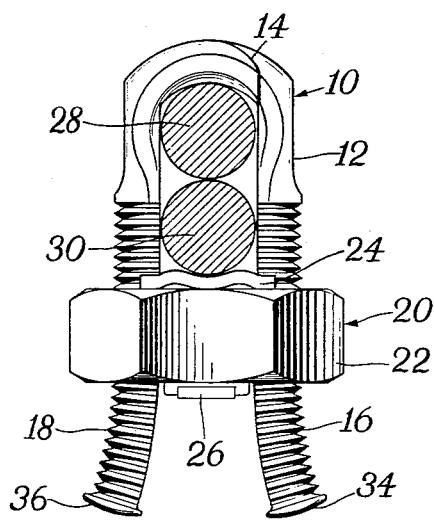
FIG. 1 is a side elevation view of the connector of my invention fully assembled to the tap and line conductor.

In order to assemble the electrical connector of my invention to a pair of conductors, the nut and pressure pad assembly 20 is backed off down the threaded legs 16 and 18 until it reaches the shoulders 34 and 36 which prevent the complete removal of the assembly 20 from the split bolt 10. Due to the curve in the legs 16 and 18, as the nut 22 is backed down the shank, the curved portions are brought closer together. As the curve requires the legs 16 and 18 to be brought closer together, the split 14 in the head of the bolt opens up as is shown in FIGS. 3 and 4. This opening permits the cables 28 and 30 to be inserted therein, and the bolt head is closed by threading the nut and pad assembly 20 up the legs 16 and 18 toward the head of the split bolt. When the nut and pressure pad assembly 20 is threaded on the curved legs 16 and 18, the split 14 closes, forming a closed U in the head, and the legs 16 and 18 take their outwardly curved position shown in FIG. 1. In this condition, the pressure pad 24 clamps the conductors 28 and 30 against the closed U, thereby making a good mechanical and electrical connection.

I have thus described my invention, but I desire it understood that it is not confined to the particular forms or usage shown and described, the same being merely illustrative and that the invention may be carried out in other ways without departing from the spirit of my invention, and therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A connector for elongate members comprising: a bolt; said bolt including a threaded shank portion formed by a pair of independent and spaced apart legs, and a head portion formed by a pair of projections, each of said projections being integral with an end of one of said legs, and having a surface adapted to abut a mating surface on the other of said projections; said legs defining an elongate member receiving slot; said projections adapted to close one end of said slot; each of said legs in a subportion of its length remote from its said projection being curved away from said other leg; and in a subportion of its length adjacent to its said projection being parallel to said other leg; nut means disposed on said shank portion and adapted to traverse the length thereof and including a diametric member disposed between said legs; said nut means serving to constrain the subportions of said pair of legs included therewithin to a fixed spaced apart relation; whereby disposition of said nut means on said parallel leg subportions maintains said projections in an abutting and closed relationship, while disposition of said nut means on said curved apart leg subportions maintains said projections in an open, spaced apart relationship whereby an elongate member may be passed therebetween.

2. A connector according to claim 1 wherein said diametric member is a pressure bar interlocked to said nut means against relative longitudinal movement but free for relative rotational movement therewith.

References Cited in the file of this patent

UNITED STATES PATENTS

| | | |
|---|---|---|
| 270,705 | Tumey | Jan. 16, 1883 |
| 1,939,813 | Hagist | Dec. 19, 1933 |
| 2,039,462 | Stonecipher | May 5, 1936 |
| 2,218,210 | Mebold | Oct. 15, 1940 |
| 2,340,011 | Moore et al. | Jan. 25, 1944 |
| 2,453,474 | Thumann | Nov. 9, 1948 |